(12) United States Patent
Le

(10) Patent No.: US 6,621,326 B1
(45) Date of Patent: Sep. 16, 2003

(54) P-CHANNEL NEGATIVE PUMPS

(75) Inventor: Thien Le, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 09/944,356

(22) Filed: Aug. 30, 2001

Related U.S. Application Data
(60) Provisional application No. 60/243,957, filed on Oct. 26, 2000.

(51) Int. Cl.[7] .............................. G05F 1/10; G05F 3/02
(52) U.S. Cl. ...................................................... 327/536
(58) Field of Search ............................... 327/536, 537, 327/589

(56) References Cited

U.S. PATENT DOCUMENTS

| | | | |
|---|---|---|---|
| 5,406,517 A | | 4/1995 | Chang et al. .......... 365/189.09 |
| 5,973,979 A | | 10/1999 | Chang et al. ............. 365/226 |
| 6,097,161 A | * | 8/2000 | Takano et al. .............. 315/291 |
| 6,130,572 A | * | 10/2000 | Ghilardelli et al. ......... 327/534 |
| 6,137,344 A | * | 10/2000 | Miki .......................... 327/536 |
| 6,157,242 A | * | 12/2000 | Fukui ......................... 327/536 |
| 6,198,342 B1 | * | 3/2001 | Kawai ........................ 327/534 |
| 6,459,328 B1 | * | 10/2002 | Sato .......................... 327/536 |

* cited by examiner

*Primary Examiner*—Terry D. Cunningham
*Assistant Examiner*—Quan Tra
(74) *Attorney, Agent, or Firm*—Morrison & Foerster LLP

(57) ABSTRACT

A charge pump circuit is described. The charge pump circuit includes: a first pumping stage including a first switch and a second switch coupled to the first switch; and at least a second pumping stage coupled to the first pumping stage, where the second pumping stage includes a third switch and a fourth switch coupled to the third switch; where the first and second switches are in opposite states, further where immediately prior to the first switch transitioning from an off state to an on state, the second switch and the fourth switch are on. In one embodiment, the third and fourth switches are in opposite states, where immediately prior to the third switch transitioning from an off state to an on state, the second switch and the fourth switch are on.

54 Claims, 2 Drawing Sheets

P-CHANNEL NEGATIVE PUMPS

CROSS-REFERENCE TO RELATED APPLICATIONS

This application claims the benefit of U.S. Provisional Application Ser. No. 60/243,957, filed Oct. 26, 2000, and entitled "P-channel Negative Pumps".

BACKGROUND OF THE INVENTION

1. Field of the Invention

This invention relates generally to integrated circuits and, in particular, to pump circuits used in integrated circuits.

2. Description of the Related Art

In some integrated circuits, it is desirable to have a circuit that provides a high negative voltage. This is particularly true for integrated circuits that include memory devices, such as, for example, electrically erasable programmable read-only-memory (EEPROM) devices. The high negative voltage is applied to control gates of memory cells during erasure to erase the data stored in the memory cells.

An example of a pump circuit that provides a negative voltage is described in U.S. Pat. No. 5,406,517. Some P-channel negative charge pumps, such as that of U.S. Pat. No. 5,406,517, operate with a power supply voltage $V_{CC}$ of 5 volts. However, at lower power supply voltages, such as 3 volts or lower, these charge pumps are made impractical due to source bias and large body-effect coefficients, unless clock signals themselves are pumped to a higher voltage than the power supply voltage $V_{CC}$.

As a result, there has been a need for a charge pump circuit that is practical at lower power supply voltages.

SUMMARY OF THE INVENTION

The present invention encompasses a charge pump circuit. In one embodiment, the charge pump circuit of the present invention includes: a first pumping stage including a first switch and a second switch coupled to the first switch; and at least a second pumping stage coupled to the first pumping stage, where the second pumping stage includes a third switch and a fourth switch coupled to the third switch; where the first and second switches are in opposite states, further where immediately prior to the first switch transitioning from an off state to an on state, the second switch and the fourth switch are on.

In one embodiment, the third and fourth switches are in opposite states, and immediately prior to the third switch transitioning from an off state to an on state, the second switch and the fourth switch are on.

The present invention is explained in more detail below with reference to the drawings.

DETAILED DESCRIPTION OF THE INVENTION

The present invention comprises a P-channel negative charge pump circuit that provides a relatively large negative output voltage. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
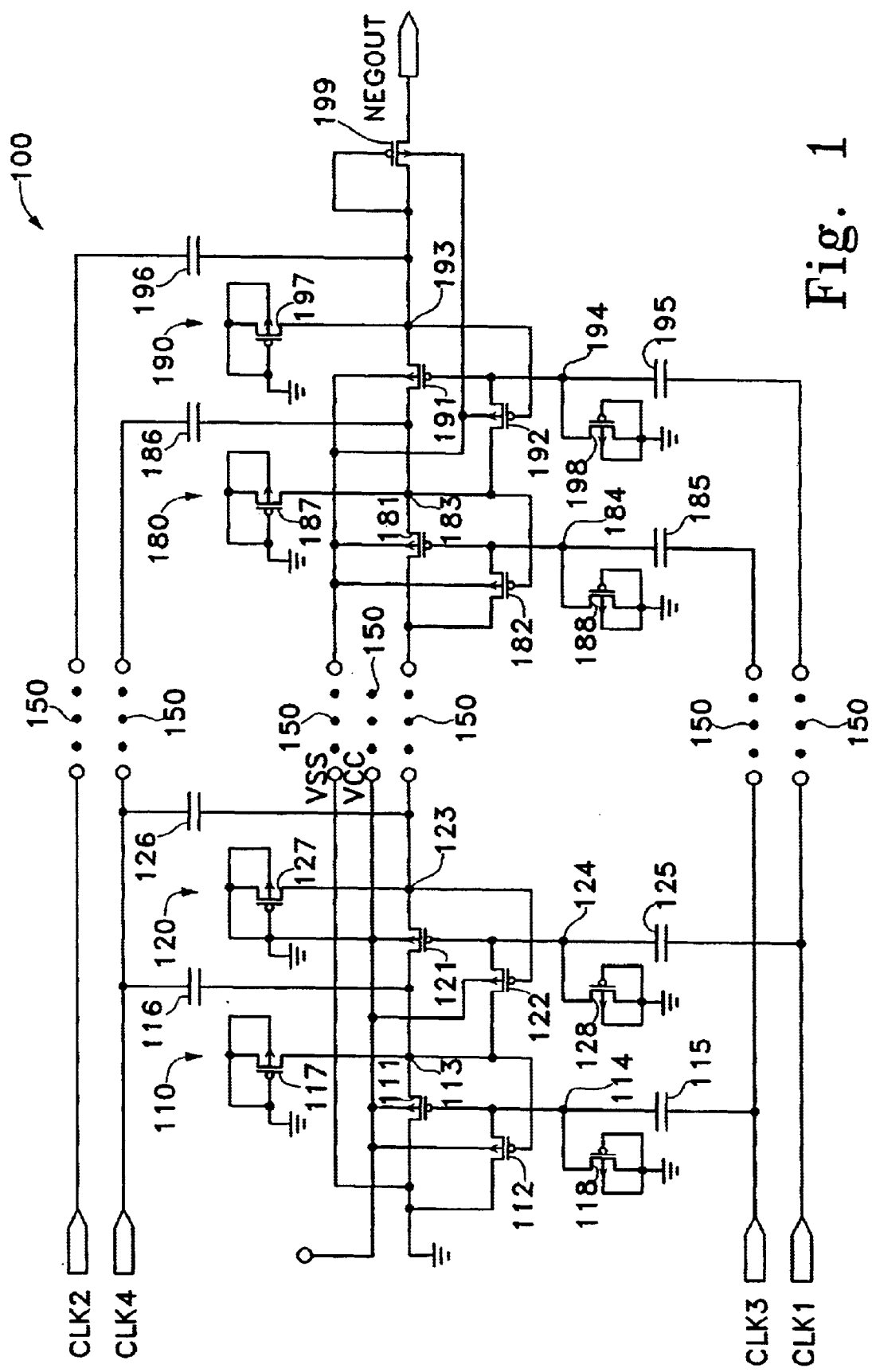
FIG. 1 is a circuit diagram of a P-channel charge pump circuit of the present invention.

FIG. 1 is a circuit diagram of an embodiment of the P-channel charge pump circuit of the present invention. In FIG. 1, P-channel charge pump circuit 100 includes a first pumping stage 110, a second pumping stage 120, and an (X–1)th pumping stage 180, and an X-th pumping stage 190, where X is an integer, and, in this specific case, X is an integer greater than 3. The X-th pumping stage 190 may also herein be referred to as the last pumping stage 190 or the output pumping stage 190. The P-channel charge pump circuit 100 also includes transistor 199. Transistor 199 serves to reduce fluctuations in the output voltage of the P-channel charge pump circuit 100. As can be seen in FIG. 1, the gate and drain of transistor 199 are coupled to each other and as a result transistor 199 acts as a diode. Accordingly, there is a one threshold voltage difference between the output node NEGOUT (coupled to the source of transistor 199) and the node 193 (coupled to the drain of transistor 199).

Not shown expressly in FIG. 1, but symbolized by ellipses 150 between the second pumping stage 120 and the (X–1)th pumping stage 180 are any additional pumping stages that may exist between the second pumping stage 120 and the (X–1)th pumping stage 180. For example, in one embodiment of the invention, there are eight pumping stages in the P-channel charge pump circuit 100. In that embodiment, X is equal to 8 and there are four pumping stages (the third to sixth pumping stages) between the second pumping stage 120 and the (X–1)th pumping stage 180.

Inputs to the P-channel charge pump circuit 100 include CLOCK 1, CLOCK 2, CLOCK 3, and CLOCK 4 signals. In one embodiment, the clock signals CLOCK 1, CLOCK 2, CLOCK 3, and CLOCK 4 are power supply voltages that alternate between 0 and $V_{CC}$ volts. In one embodiment of the present invention, $V_{CC}$ is 1.8 volts. The present invention, however, is not limited to operating at a $V_{CC}$ of 1.8 volts, but may also work with higher and lower $V_{CC}$ voltages. For example, $V_{CC}$ may be 1.5 volts. The output node NEGOUT of the P-channel charge pump circuit 100 is coupled to transistor 199 which is in turn coupled to the output node 193 of the X-th pumping stage 190.

As can be seen in FIG. 1, the first pumping stage 110 includes a main pumping transistor 111 and a compensation transistor 112. The drain of the main pumping transistor 111 is coupled to the gate of the compensation transistor 112, while the drain of the compensation transistor 112 is coupled to the gate of the main pumping transistor 111. Additionally, the source of the main pumping transistor 111 is coupled to the source of the compensation transistor 112. Additionally, the gate of the main pumping transistor 111 is coupled to the CLOCK 3 signal through capacitor 115, while the gate of the compensation transistor 112 is coupled to the CLOCK 4 signal through capacitor 116. The first pumping stage 110 also includes initialization transistors 117 and 118 which are coupled to the drains of transistors 111 and 112, respectively.

The second pumping stage 120 is very similar to the first pumping stage 110. The main difference between the first and second pumping stages 110 and 120 is the coupling of the clock signals to the main pumping transistor and the compensation transistor. In the first pumping stage 110, CLOCK 3 is coupled to the gate of the main pumping transistor 111, while CLOCK 4 is coupled to the gate of the compensation transistor 112. On the other hand, in the second pumping stage 120, CLOCK 1 is coupled to the gate of the main pumping transistor 121, while CLOCK 2 is coupled to the gate of the compensation transistor 122. This arrangement of the coupling of the clock signals to the gates of the main pumping and compensation transistors is alternated at each pumping stage until the X-th pumping stage 190. Thus, if in an Mth pumping stage (where M is an integer), the gates of the main pumping transistor and the compensation transistor are coupled to CLOCK 1 and CLOCK 2 signals, respectively, then in the (M+1)th pumping stage, the gates of the main pumping transistor and the compensation transistor would be coupled to CLOCK 3 and CLOCK 4 signals, respectively. By extension, in the (M+2)th pumping stage, the gates of the main pumping transistor and the compensation transistor would be coupled to CLOCK 1 and CLOCK 2, respectively.

In the embodiment shown in FIG. 1, the (X−1)th pumping stage 180 is identical to the first pumping stage 110 in terms of the coupling of the clock signals CLOCK 1–4. Similarly, the X-th pumping stage 190 is identical to the second pumping stage 120 in terms of the coupling of the clock signals CLOCK 1–4. This identity will exist assuming that there are zero or an even number of pumping stages between the second pumping stage 120 and the (X−1)th pumping stage 180. Otherwise, the coupling of the clock signals to the (X−1)th pumping stage 180 would be identical to those in the second pumping stage 120. Similarly, the coupling of the clock signals to the Xth pumping stage 190 would be identical to those in the first pumping stage 110.

One difference between the first and second pumping stages 110 and 120 and the (X−1)th and X-th pumping stages 180 and 190 is the bias applied to the main pumping transistors and the compensation transistors in those stages. As can be seen in FIG. 1, in the earlier stages, such as the first and second pumping stages 110 and 120, main pumping transistors and the compensation transistors are biased by the power supply voltage $V_{CC}$. On the other hand, in the later stages, such as the (X−1)th stage 180 and the X-th pumping stage 190, the main pumping transistors compensation transistors are biased by $V_{SS}$, which is coupled to ground The first pumping stage 110 is described as including initialization transistors 117 and 118 and capacitors 115 and 116. Similarly, the second pumping stage 120 is described as including initialization transistors 127 and 128 and capacitors 125 and 126, while the (X−1)th pumping stage 180 is described as including initialization transistors 187 and 188 and capacitors 185 and 186, and the X-th pumping stage 190 is described as including initialization transistors 197 and 198 and capacitors 195 and 196. Alternatively, the first pumping stage 110 may be said to include transistors 111 and 112, but not the initialization transistors 117 and 118 or the capacitors 115 and 116. Similarly, the second pumping stage 120 may be said to include transistors 121 and 122, but not the initialization transistors 127 and 128 or the capacitors 125 and 126. Similarly, the (X−1)th pumping stage 180 maybe said to include transistors 181 and 182, but not the initialization transistors 187 and 188 or the capacitors 185 and 186. Finally, the X-th pumping stage 190 may be said to include transistors 191 and 192, but not the initialization transistors 197 and 198 or the capacitors 195 and 196.

In one embodiment, the initialization transistors, such as initialization transistors 117 and 118 initialize the voltages at the drains of transistors 111 and 112, i.e., at nodes 113 and 114, respectively. As can be seen in FIG. 1, the gate and source of each of initialization transistors 117 and 118 are coupled to one another. Moreover, the gate and source are coupled to ground voltage. Thus, the initialization transistors 117 and 118 initialize the drains of transistors 111 and 112 at one threshold voltage above ground. The initialization transistors in the other charging stages perform a similar function in their respective stages.

Figure 2:
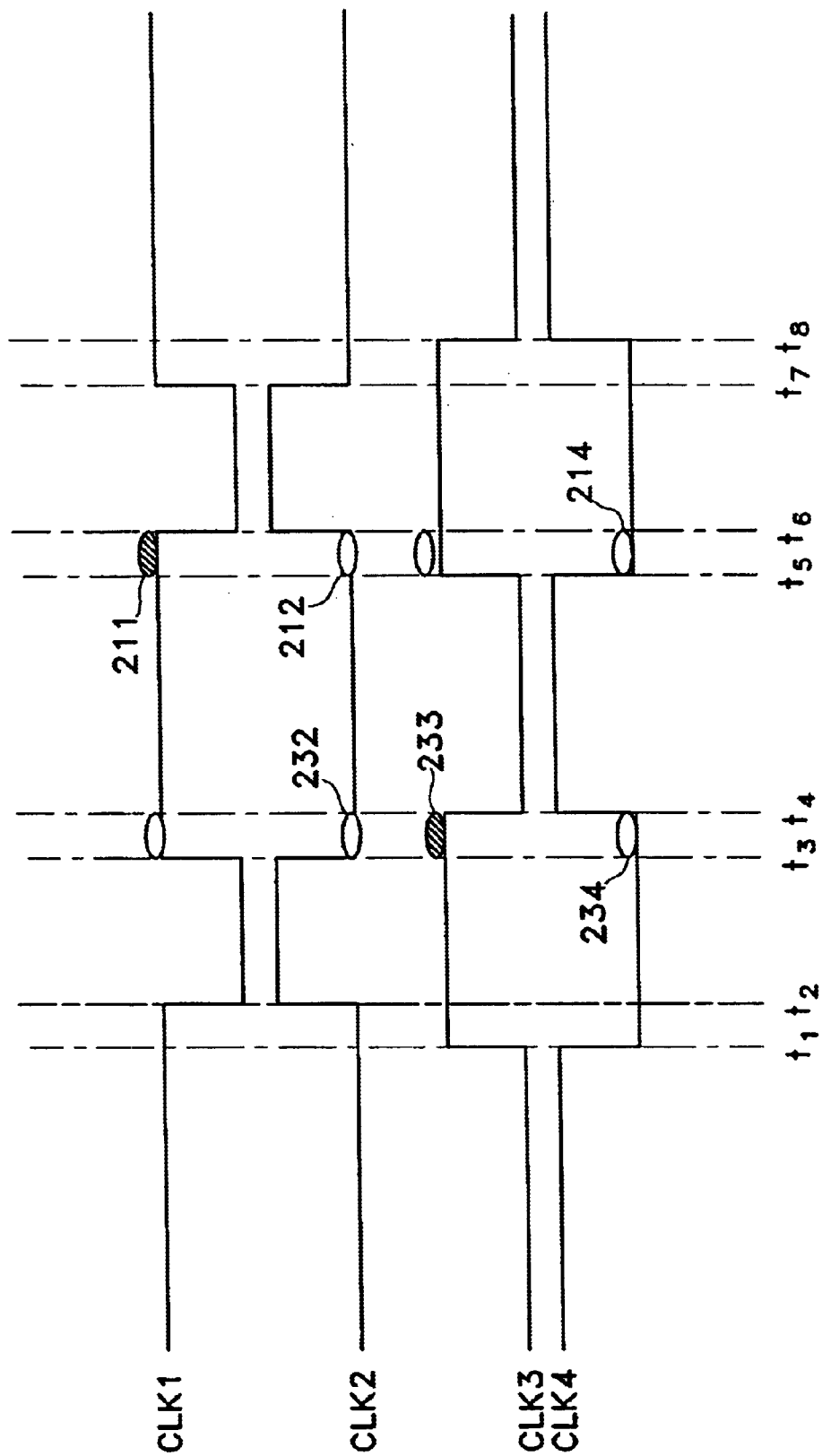
FIG. 2 is a timing diagram of the clock signals used in the P-channel charge pump circuit of the present invention.

The main pumping transistor 111 pumps charge from its drain (at node 113) to its source, which is coupled to ground. Pumping charge from the drain reduces the voltage at the drain. The voltage at the drain (e.g., at node 113) is further lowered by transitioning the clock signal CLOCK 4 coupled to node 113 from high to low. As shown in FIG. 2, the high to low transition of CLOCK 4 occurs at the same time as the low to high transition of CLOCK 3. When CLOCK 3 is high, the main pumping transistor 111 is off. Having the main pumping transistor 111 off when CLOCK 4 is low reduces the possibility of charge flow from the source to the drain (which is coupled to CLOCK 4) of the main pumping transistor 111. Each of the main pumping transistors in the other stages similarly pumps charge from drain to source (i.e., along the path from the output node NEGOUT to the ground coupled to the source of transistor 111.) Additionally, at each pumping stage, the voltage at the drain of the main pumping transistor is further lowered by transitioning the clock signal coupled to the drain from high to low. Thus, the voltage at the drains of the main pumping stages is lowered from stage to stage. In other words, the voltage at the drain (at node 123) of the main pumping transistor 121 (in the second pumping stage 120) is lower than the voltage at node 113 coupled to the drain of the main pumping transistor 111 (in the first pumping stage 110.) Similarly, the voltage at. node 183 is lower than the voltage at node 123. Finally, the voltage at node 193 is lower than the voltage at node 183. In one embodiment of the invention with eight pumping stages and a power supply voltage of 1.8 volts, the output voltage of the P-channel charge pump circuit (i.e., at the output node NEGOUT) is approximately −8 volts while the P-channel charge pump circuit supplies a current of approximately 60 microamperes (µA).

The compensation transistor 112 pumps charge from the gate to the source of the main pumping transistor 111. This reduces the voltage at the gate of the main pumping transistor 111. This reduction in the voltage at the gate increases the likelihood that the main pumping transistor 111 will turn on when a low CLOCK 1 signal is applied to its gate. The compensation transistors in other stages perform a similar function in their respective stages. This function is particularly useful in the later pumping stages where the relatively low source voltages have a greater source bias effect on the threshold voltages of the main pumping transistors.

FIG. 2 is a timing diagram of the clock signals used in the P-channel charge pump circuit of the present invention. In one embodiment, the charge pump circuit of the present invention uses four clock signals. In one embodiment, when CLOCK 1 is high, CLOCK 2 is low and vice versa. In other words, CLOCK 1 and CLOCK 2 are in opposite states. Moreover, when CLOCK 1 transitions from a low (e.g., 0 volts in one embodiment) to a high (e.g., $V_{CC}$ volts in one embodiment) voltage, CLOCK 2 transitions from a high to a low voltage. Also in one embodiment, when CLOCK 3 is high, CLOCK 4 is low and vice versa. In other words, CLOCK 3 and CLOCK 4 are in opposite states. Moreover, when CLOCK 3 transitions from a low (e.g., 0 volts in one embodiment) to a high (e.g., $V_{CC}$ volts in one embodiment) voltage, CLOCK 4 transitions from a high to a low voltage.

As explained above, CLOCKS 1 and 2 are applied to the main pumping and compensation transistors respectively of some pumping stage, e.g., pumping stage 120 and pumping stage 190. Similarly, CLOCKS 3 and 4 are applied to the main pumping and compensation transistors respectively of other pumping stages, e.g., pumping stage 110 and pumping stage 180. As CLOCKS 1 and 2 are in opposite states, in each of the pumping stages to which CLOCKS 1 and 2 apply, the main pumping transistor and the compensation transistor (e.g., transistors 121 and 122) are not both off at the same time. Transistors 121 and 122 would both be off, for example, if both CLOCK 1 and CLOCK 2 were high at the same time since both transistors 121 and 122 are P-channel transistors. When both transistors 121 and 122 are off, the pumping stage 120 is neither charge pumping nor reducing the voltage at the gate of the main charge pumping transistor, i.e., threshold voltage compensating. The opposite states of CLOCKS 3 and 4 have a similar effect on the pumping stages to whose main pumping transistor and compensation transistor CLOCKS 3 and 4 are coupled.

Additionally, due to the opposite states of CLOCKS 1 and 2, the main pumping transistor is on (as the clock signal CLOCK 1 coupled to the gate of the main pumping transistor is low) when the voltage at its drain is high (as the clock signal CLOCK 2 coupled to the drain of the main pumping transistor is high). As a result, charge is pumped from the drain to the source of the main pumping transistor, i.e., away from the output node NEGOUT. Moreover, when the voltage at the drain is low (as the clock signal CLOCK 2 coupled to the drain of the main pumping transistor is low), the main pumping transistor is off (as the clock signal CLOCK 1 coupled to the gate of the main pumping transistor is high.) As a result charge is not pumped from source to drain, i.e., towards the output node NEGOUT. Similarly, the opposite states of CLOCKS 3 and 4 provide a similar effect in the pumping stages to which they are applied.

As can also be seen in FIG. 2, in one embodiment, immediately prior to CLOCK 1 transitioning from a high state (i.e., an off state for transistors to whose gates CLOCK 1 is coupled, e.g., transistors 121 and 191) to a low state (i.e., an on state for transistors to whose gates CLOCK 1 is coupled, e.g., transistors 121 and 191), both CLOCK 2 and CLOCK 4 are in their respective low states (i.e., on states for transistors to whose gates CLOCK 2 and CLOCK 4 are coupled, e.g., transistors 112, 122, 182, and 192). One example of the time segment immediately prior to CLOCK 1 transitioning from a high state to the low state is the time between times $t_5$ and $t_6$ shown in FIG. 2. As can be seen in FIG. 2, CLOCK 2 and CLOCK 4 are both low between times $t_5$ and $t_6$. For CLOCK 1, CLOCK 2, and CLOCK 4, the time segment between times $t_5$ and $t_6$ is represented by the shaded oval 211, unshaded oval 212, and unshaded oval 214, respectively.

Having CLOCK 2 low immediately prior to CLOCK 1 transitioning from high to low, increases the likelihood that the compensation transistor (e.g., compensation transistor 122) coupled to the gate of the main pumping transistor (e.g., main pumping transistor 121) is on just prior to the transition. As a result, the voltage at the gate of the main pumping transistor is lowered prior to the application of a low by CLOCK 1 so as to increase the likelihood that the main pumping transistor turns on when CLOCK 1 transitions from high to low. As noted above, this is particularly useful in later stages when the relatively low source voltage has a greater source bias effect on the threshold voltage. CLOCK 4 is low immediately prior to the transition so that the voltage at the source of the main pumping transistor (e.g., main pumping transistor 121) is low prior to the application of a low signal to the gate of the main pumping transistor. As a result, when a low signal (using a low CLOCK 1 signal) is applied to the gate of the main pumping transistor, the voltage at the source of the main pumping transistor is relatively low so that the main pumping transistor discharges from drain to source, (i.e., towards ground rather than the output node NEGOUT).

Similarly, in one embodiment, immediately prior to CLOCK 3 transitioning from a high state (i.e., an off state for transistors to whose gates CLOCK 3 is coupled, e.g., transistors 111 and 181) to a low state (i.e., an on state for transistors to whose gates CLOCK 3 is coupled, e.g., transistors 111 and 181), both CLOCK 2 and CLOCK 4 are in their respective low states (i.e., on states for transistors to whose gates CLOCK 2 and CLOCK 4 are coupled, e.g., transistors 112, 122, 182 and 192). One example of the time segment immediately prior to CLOCK 3 transitioning from a high state to the low state is the time segment between times $t_3$ and $t_4$ shown in FIG. 2. As can be seen in FIG. 2, CLOCK 2 and CLOCK 4 are both low between times $t_3$ and $t_4$. For CLOCK 3, CLOCK 2, and CLOCK 4, the time segment between times $t_3$ and $t_4$ is represented by the shaded oval 233, unshaded oval 232, and unshaded oval 234, respectively. The above relation between CLOCKS 2, 3, and 4 has a similar effect as that described above with respect to CLOCKS 1, 2, and 4 in the corresponding pumping stages (e.g., pumping stages 110 and 180).

As can also be seen in FIG. 2, in one embodiment, when CLOCK 1 is low, CLOCK 3 is high, and when CLOCK 3 is low, CLOCK 1 is high. As a result adjacent main pumping transistors are not on at the same time, e.g., main pumping transistors 111 and 121 are not on at the same time. This reduces the likelihood of discharge to the output node NEGOUT. Also in one embodiment, when CLOCK 2 is high, CLOCK 4 is low, and when CLOCK 4 is high, CLOCK 2 is low. This also reduces the likelihood of discharge to the output node NEGOUT.

Furthermore, when CLOCK 2 is high, CLOCK 3 is high. Due to the high state of CLOCK 3, the main pumping transistors to whose gates CLOCK 3 is coupled are off. This prevents the high voltage at their source due to the high state of CLOCK 2 from driving charge from the source to the drain of the main pumping transistors, thus preventing discharge to the output node NEGOUT. Similarly, when CLOCK 4 is high, CLOCK 1 is high. This relation between CLOCKS 1 and 4 has a similar effect as the above described effect due to the relation of CLOCKS 2 and 3.

The negative charge pump circuit of the present invention may be used in many systems in which it is desired to provide a relatively large negative voltage. For example, the negative charge pump circuit may be used in a digital system. More specifically, the negative charge pump circuit may be used in a digital system comprising a programmable logic device (PLD). Additionally, the negative charge pump circuit may be used in a PLD. As used herein a digital system is not intended to be limited to a purely digital system, but also encompasses hybrid systems that include both digital and analog subsystems. Thus, the present invention encompasses digital systems that include the charge pump circuit described herein.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. A charge pump circuit comprising:
a first pumping stage comprising a first switch, a second switch coupled to the first switch, a first initialization transistor coupled to the first switch, wherein the first initialization transistor initializes a terminal of the first switch at a first voltage, and a second initialization transistor coupled to the second switch, where the second initialization transistor initializes a terminal of the second switch at a second voltage; and
at least a second pumping stage coupled to the first pumping stage, wherein the second pumping stage comprises a third switch and a fourth switch coupled to the third switch;
wherein the first and second switches are in opposites states, further wherein immediately prior to the first switch transitioning from an off state to an on state, the second switch and the fourth switch are on.

2. The charge pump circuit of claim 1, wherein the third and fourth switches are in opposite states, further wherein immediately prior to the third switch transitioning from an off state to an on state, the second switch and the fourth switch are on.

3. The charge pump circuit of claim 1, wherein the first switch comprises a first P-channel transistor having a first gate, a first source and a first drain, further wherein said second switch comprises a second P-channel transistor having a second gate, a second source and a second drain, wherein the first source is coupled to the second source, further wherein the first drain is coupled to the second gate, and further wherein the first gate is coupled to the second drain.

4. The charge pump circuit of claim 3, wherein first and second clock signals are coupled to the first and second gates, respectively.

5. The charge pump circuit of claim 4, wherein the third switch comprises a third P-channel transistor having a third gate, a third source and a third drain, further wherein said fourth switch comprises a fourth P-channel transistor having a fourth gate, a fourth source and a fourth drain, wherein the third source is coupled to the fourth source, further wherein the third drain is coupled to the fourth gate, and further wherein the third gate is coupled to the fourth drain.

6. The charge pump circuit of claim 5, wherein third and fourth clock signals are coupled to the third and fourth gates, respectively.

7. The charge pump circuit of claim 6, wherein the first drain is coupled to the third source, further wherein the second gate is coupled to the fourth source.

8. The charge pump circuit of claim 1, wherein when the first switch is on, the third switch is off, and further wherein when the third switch is on, the first switch is off.

9. The charge pump circuit of claim 1, wherein when the second switch is off, the fourth switch is on, and further wherein when the fourth switch is off, the second switch is on.

10. The charge pump circuit of claim 1, wherein when the second switch is off the third switch is off, and further wherein when the fourth switch is off, the first switch is off.

11. The charge pump circuit of claim 1 comprising X pumping stages, wherein X is an integer greater than two.

12. The charge pump circuit of claim 11, wherein X is equal to eight.

13. A digital system including a programmable logic device and the charge pump circuit of claim 1.

14. A programmable logic device including the charge pump circuit of claim 1.

15. A charge pump circuit comprising:
a first pumping stage comprising a first switch and a second switch coupled to the first switch, wherein a first clock signal having a first high state and a first low state is coupled to the first switch and a second clock signal having a second high state and a second low state is coupled to the second switch;
a second pumping stage coupled to the first pumping stage, wherein the second pumping stage comprises a third switch and a fourth switch coupled to the third switch, wherein a third clock signal having a third high state and a third low state is coupled to the third switch and a fourth clock signal having a fourth high state and a fourth low state is coupled to the fourth switch;
an (X−1)th pumping stage comprising a fifth switch and a sixth switch coupled to the fifth switch, wherein X is an integer greater than or equal to 4; and
an Xth pumping stage coupled to the (X−1)th pumping stage, the Xth pumping stage comprising a seventh switch and an eight switch coupled to the seventh switch;
wherein the first and second clock signals are in opposite states, further wherein immediately prior to the first clock signal transitioning from the first high state to the first low state, the second clock signal and the fourth clock signal are at the second low state and the fourth low state, respectively, further wherein the first, second, third, and fourth switches are biased by a power supply voltage, further wherein the fifth, sixth, seventh, and eight switches are biased by a ground potential, wherein the Xth pumping stage and the (X−1)th pumping stage are the last and the next to last pumping stages of the charge pump circuit, respectively.

16. The charge pump circuit of claim 15, wherein the third and fourth clock signals are in opposite states, further wherein immediately prior to the third clock signal transitioning from a third high state to a third low state, the second clock signal and the fourth clock signal are at the second low state and the fourth low state, respectively.

17. The charge pump circuit of claim 15, wherein the first switch comprises a first P-channel transistor having a first gate, a first source and a first drain, further wherein said second switch comprises a second P-channel transistor having a second gate, a second source and a second drain, wherein the first source is coupled to the second source, further wherein the first drain is coupled to the second gate, and further wherein the first gate is coupled to the second drain.

18. The charge pump circuit of claim 17, wherein the first and second clock signals are coupled to the first and second gates, respectively.

19. The charge pump circuit of claim 18, wherein the third switch comprises a third P-channel transistor having a third gate, a third source and a third drain, further wherein said fourth switch comprises a fourth P-channel transistor having a fourth gate, a fourth source and a fourth drain, wherein the third source is coupled to the fourth source, further wherein the third drain is coupled to.the fourth gate, and further wherein the third gate is coupled to the fourth drain.

20. The charge pump circuit of claim 19, wherein the third and fourth clock signals are coupled to the third and fourth gates, respectively.

21. The charge pump circuit of claim 20, wherein the first drain is coupled to the third source, further wherein the second gate is coupled to the fourth source.

22. The charge pump circuit of claim 15, wherein when the first clock signal is at the first low state, the third clock signal is at the third high state, and further wherein when the third clock signal is at the third low state, the first clock signal is at the first high state.

23. The charge pump circuit of claim 15, wherein when the second clock signal is at the second high state, the fourth clock signal is at the fourth low state, and further wherein when the fourth clock signal is at the fourth high state, the second clock signal is at the second low state.

24. The charge pump circuit of claim 15, wherein when the second clock signal is at the second high state, the third clock signal is at the third high state, and further wherein when the fourth clock signal is at the fourth high state, the first clock signal is at the first high state.

25. The charge pump circuit of claim 15 comprising X pumping stages, wherein X is an integer greater than two.

26. The charge pump circuit of claim 25, wherein X is equal to eight.

27. A digital system including a programmable logic device and the charge pump circuit of claim 15.

28. A programmable logic device including the charge pump circuit of claim 15.

29. A method of charge pumping, said method comprising:
   first turning on a first switch,
   second turning on a second switch, wherein the second switch is coupled to the first switch, further wherein the first and second switches are in a first pumping stage, further wherein when the first switch is on, the second switch is off, further wherein when the first switch is off, the second switch is on;
   third turning on a third switch;
   fourth turning on a fourth switch, wherein the fourth switch is coupled to the third switch, further wherein the third and fourth switches are in a second pumping stage coupled to the first pumping stage, further wherein when the third switch is on, the fourth switch is off, further wherein when the third switch is off, the fourth switch is on;
   first initializing a terminal of the first switch at a first voltage using a fist initialization transistor coupled to the first switch; and
   second initializing a terminal of the second switch at a second voltage using a second initialization transistor coupled to the second switch;
   wherein immediately prior to first turning on the first switch, the second switch and fourth switch are on.

30. The method of claim 29, wherein immediately prior to third turning on the third switch, the second switch and the fourth switch are on.

31. The method of claim 29, wherein when the first switch is on, the third switch is off, and further wherein when the third switch is on, the first switch is off.

32. The method of claim 29, wherein when the second switch is off, the fourth switch is on, and further wherein when the fourth switch is off, the second switch is on.

33. The charge pump circuit of claim 29, wherein when the second switch is off, the third switch is off, and further wherein when the fourth switch is off, the first switch is off.

34. The charge pump circuit of claim 1, wherein the second initialization transistor initializes the terminal of the second switch at a voltage of one threshold above ground potential, further wherein the first initialization transistor initializes the terminal of the first switch at a voltage of one threshold above ground potential.

35. The charge pump circuit of claim 34, wherein the first initialization transistor comprises a first initialization transistor gate, a first initialization transistor drain, and a first initialization transistor source, wherein the first initialization transistor gate is coupled to the first initialization transistor source and ground potential, further wherein the first initialization transistor drain is coupled to the first switch, wherein the second initialization transistor comprises a second initialization transistor gate, a second initialization transistor drain, and a second initialization transistor source, wherein the second initialization transistor gate is coupled to the second initialization transistor source and ground potential, further wherein the second initialization transistor drain is coupled to the second switch.

36. The charge pump circuit of claim 35, wherein the first switch comprises a first P-channel transistor having a first gate, a first source and a first drain, further wherein said second switch comprises a second P-channel transistor having a second gate, a second source and a second drain, wherein the first source is coupled to the second source, further wherein the first drain is coupled to the second gate, and further wherein the first gate is coupled to the second drain, further wherein the first initialization transistor drain is coupled to the first drain, further wherein the second initialization transistor drain is coupled to the second drain.

37. The charge pump circuit of claim 36, wherein the second pumping stage further comprises a third initialization transistor coupled to the third switch and a fourth initialization transistor coupled to the fourth switch, wherein the third initialization transistor initializes a terminal of the third switch at a voltage of one threshold above ground potential and the fourth initialization transistor initializes a terminal of the fourth switch at a voltage of one threshold above ground potential.

38. The charge pump circuit of claim 37, wherein the third initialization transistor comprises a third initialization transistor gate, a third initialization transistor drain, and a third initialization transistor source, wherein the third initialization transistor gate is coupled to the third initialization transistor source and ground potential, further wherein the third initialization transistor drain is coupled to the third switch, wherein the fourth initialization transistor comprises a fourth initialization transistor gate, a fourth initialization transistor drain, and a fourth initialization transistor source, wherein the fourth initialization transistor gate is coupled to the fourth initialization transistor source and ground potential, further wherein the fourth initialization transistor drain is coupled to the fourth switch.

39. The charge pump circuit of claim 38, wherein the third switch comprises a third P-channel transistor having a third gate, a third source and a third drain, further wherein said fourth switch comprises a fourth P-channel transistor having a fourth gate, a fourth source and a fourth drain, wherein the third source is coupled to the fourth source, further wherein the third drain is coupled to the fourth gate, and further wherein the third gate is coupled to the fourth drain, further wherein the third initialization transistor drain is coupled to the third drain, further wherein the fourth initialization transistor drain is coupled to the fourth drain.

40. The charge pump circuit of claim 39, wherein first and second clock signals are coupled to the first and second gates, respectively, further wherein third and fourth clock signals are coupled to the third and fourth gates, respectively.

41. The charge pump circuit of claim 1 comprising X pumping stages, wherein X is an integer greater than or equal to 4, wherein the first and second switches in the first pumping stage and the third and fourth switches in the second pumping stage are biased by a power supply voltage, further wherein switches in an Xth pumping stage and an (X−1)th pumping stage are biased by ground potential, wherein the Xth pumping stage and the (X−1)th pumping stage are the last and the next to last pumping stages of the charge pump circuit, respectively.

42. The charge pump circuit of claim 39 comprising X pumping stages, wherein X is an integer greater than or equal to 4, wherein the first, second, third, and fourth P-channel transistors are biased by a power supply voltage, further wherein main pumping transistors and compensation transistors in an Xth pumping stage and an (X−1)th pumping stage are biased by ground potential, wherein the Xth pumping stage and the (X−1)th pumping stage are the last and the next to last pumping stages of the charge pump circuit, respectively.

43. The charge pump circuit of claim 15, wherein the first pumping stage further comprises a first initialization transistor coupled to the first switch and a second initialization transistor coupled to the second switch, wherein the first initialization transistor initializes a terminal of the first switch at a voltage of one threshold above ground potential, further wherein the second initialization transistor initializes a terminal of the second switch at a voltage of one threshold above ground potential.

44. The charge pump circuit of claim 43, wherein the first initialization transistor comprises a first initialization transistor gate, a first initialization transistor drain, and a first initialization transistor source, wherein the first initialization transistor gate is coupled to the first initialization transistor source and ground potential, further wherein the first initialization transistor drain is coupled to the first switch, wherein the second initialization transistor comprises a second initialization transistor gate, a second initialization transistor drain, and a second initialization transistor source, wherein the second initialization transistor gate is coupled to the second initialization transistor source and ground potential, further wherein the second initialization transistor drain is coupled to the second switch.

45. The charge pump circuit of claim 44, wherein the first switch comprises a first P-channel transistor having a first gate, a first source and a first drain, further wherein said second switch comprises a second P-channel transistor having a second gate, a second source and a second drain, wherein the first source is coupled to the second source, further wherein the first drain is coupled to the second gate, and further wherein the first gate is coupled to the second drain, further wherein the first initialization transistor drain is coupled to the first drain, further wherein the second initialization transistor drain is coupled to the second drain.

46. The charge pump circuit of claim 45, wherein the second pumping stage further comprises a third initialization transistor coupled to the third switch and a fourth initialization transistor coupled to the fourth switch, wherein the third initialization transistor initializes a terminal of the third switch at a voltage of one threshold above ground potential, and the fourth initialization transistor initializes a terminal of the fourth switch at a voltage of one threshold above ground potential.

47. The charge pump circuit of claim 46, wherein the third initialization transistor comprises a third initialization transistor gate, a third initialization transistor drain, and a third initialization transistor source, wherein the third initialization transistor gate is coupled to the third initialization transistor source and ground potential, further wherein the third initialization transistor drain is coupled to the third switch, wherein the fourth initialization transistor comprises a fourth initialization transistor gate, a fourth initialization transistor drain, and a fourth initialization transistor source, wherein the fourth initialization transistor gate is coupled to the fourth initialization transistor source and ground potential, further wherein the fourth initialization transistor drain is coupled to the fourth switch.

48. The charge pump circuit of claim 47, wherein the third switch comprises a third P-channel transistor having a third gate, a third source and a third drain, further wherein said fourth switch comprises a fourth P-channel transistor having a fourth gate, a fourth source and a fourth drain, wherein the third source is coupled to the fourth source, further wherein the third drain is coupled to the fourth gate, and further wherein the third gate is coupled to the fourth drain, further wherein the third initialization transistor drain is coupled to the third drain, further wherein the fourth initialization transistor drain is coupled to the fourth drain.

49. The charge pump circuit of claim 48, wherein the first, second, third, and fourth P-channel transistors are biased by the power supply voltage, further wherein main pumping transistors and compensation transistors in the (X−1)th pumping stage and the Xth pumping stage are biased by ground potential.

50. The method of claim 29, wherein the first and second switches comprise first and second transistors, respectively, wherein the first and second transistors comprise first and second drains, respectively, further wherein the first initializing comprises initializing the first drain at a voltage one threshold voltage above ground potential, further wherein the second initializing comprises initializing the second drain at a voltage one threshold voltage above ground potential.

51. The method of claim 50 further comprising third initializing a terminal of the third switch using a third initialization transistor coupled to the third switch and fourth initializing a terminal of the fourth switch using a fourth initialization transistor coupled to the fourth switch.

52. The method of claim 51, wherein the third and fourth switches comprise third and fourth transistors, respectively, wherein the third and fourth transistors comprise third and fourth drains, respectively, further wherein the third initializing comprises initializing the third drain at a voltage one threshold voltage above ground potential, further wherein the fourth initializing comprises initializing the fourth drain at a voltage one threshold voltage above ground potential.

53. The method of claim 52 further comprising:

fifth turning on a fifth switch;

sixth turning on a sixth switch, wherein the fifth switch is coupled to the sixth switch, further wherein the fifth and sixth switches are in an (X−1)th pumping stage, further wherein the fifth and sixth switches comprise fifth and sixth transistors, respectively, wherein X is an integer greater than or equal to 4;

seventh turning on a seventh switch;

eighth turning on an eighth switch, wherein the seventh switch is coupled to the eighth switch, further wherein the seventh and eighth switches are in an Xth pumping stage coupled to the (X−1)th pumping stage, further wherein the seventh and eighth switches comprise seventh and eighth transistors, respectively;

biasing the first, second, third, and fourth transistors by a power supply voltage; and biasing the fifth, sixth, seventh, and eighth transistors by a ground potential;

wherein the Xth pumping stage and the (X−1)th pumping stage are the last and the next to last pumping stages of a charge pump circuit, respectively.

54. The method of claim 29, wherein the first, second, third, and fourth switches comprise first, second, third, and fourth transistors, respectively, the method further comprising:

fifth turning on a fifth switch, sixth turning on a sixth switch, wherein the fifth switch is coupled to the sixth switch, further wherein the fifth and sixth switches are in an (X−1)th pumping stage, further wherein the fifth and sixth switches comprise fifth and sixth transistors, respectively, wherein X is an integer greater than or equal to 4;

seventh turning on a seventh switch;

eighth turning on an eighth switch, wherein the seventh switch is coupled to the eighth switch, further wherein the seventh and eighth switches are in an Xth pumping stage coupled to the (X−1)th pumping stage, further wherein the seventh and eighth switches comprise seventh and eighth transistors, respectively;

biasing the first, second, third, and fourth transistors by a power supply voltage; and biasing the fifth, sixth, seventh, and eighth transistors by a ground potential;

wherein the Xth pumping stage and the (X−1)th pumping stage are the last and the next to last pumping stages of a charge pump circuit, respectively.

\* \* \* \* \*